United States Patent [19]
Borghi et al.

[11] 3,882,416
[45] May 6, 1975

[54] THERMALLY PUMPED GASDYNAMIC LASERS

[75] Inventors: Roland P. Borghi, Chatenay-Malabry; Marc A. Charpenel, Longjumeau; Jean-Pierre Taran, Bures-sur-Yvette, France

[73] Assignee: Office National d'Etudes et de Recherches Aerospatiales, Chatillon, France

[22] Filed: July 16, 1973

[21] Appl. No.: 379,478

[30] Foreign Application Priority Data
July 17, 1972 France ............................. 72.25705
Mar. 16, 1973 France ............................. 73.09584

[52] U.S. Cl. ........................... 331/94.5 G; 330/4.3
[51] Int. Cl. ........................... H01s 3/22; H01s 3/09
[58] Field of Search ..................... 331/945; 330/4.3

[56] References Cited
UNITED STATES PATENTS
3,760,294  8/1973  Roberts et al. ............... 331/94.5

OTHER PUBLICATIONS
Bronfin et al., Applied Physics Letters, Vol. 16, No. 5, 1, March, 1970, QC 1 A745.
Lee et al., AiAA Journal, Vol. 10, No. 1, January, 1972, pp. 65–71.

Primary Examiner—Robert J. Webster
Attorney, Agent, or Firm—Abraham A. Saffitz

[57] ABSTRACT

Carbon oxide molecular gasdynamic laser with a stagnation chamber filled in which a hot pressurized gas or gas mixture and a supersonic nozzle connected to the chamber and forming a hot gas stream along which the gas is cooled due to expansion. An injector is situated near the throat of the nozzle and injects a cold gas stream coaxially into the hot stream. In the case of a $CO_2$ molecular gasdynamic laser, the hot stream comprises nitrogen alone and the cold gas stream $CO_2$ and a relaxant additive monoatomic gas. In the case of a CO molecular gasdynamic laser, the hot gas stream comprises a mixture of nitrogen and CO and the cold gas stream the relaxant additive monoactomic gas. The mixture of nitrogen and CO can be obtained by an exothermic chemical reaction in the stagnation chamber.

5 Claims, 5 Drawing Figures

THERMALLY PUMPED GASDYNAMIC LASERS

The invention relates in generalised manner to gasdynamic lasers of the "thermal pumping" type wherein a mixture of gases in initial balance is expanded rapidly through a supersonic nozzle to a high Mach number in a time short compared to the vibrational relaxation time of the upper laser level to produce a population inversion in one of the ingredients of the mixture.

Thermically pumped gasdynamic lasers employing $CO_2$ are known in the prior art, wherein a mixture of nitrogen, carbon dioxide and helium (which latter may be replaced by hydrogen or water) is first produced in a stagnation chamber wherein the gases are heated and compressed to a stagnation temperature and pressure which may, for example, amount resp. to 1,400°K and 17 atm. The gases are expanded through a supersonic convergent-divergent nozzle or an array of small nozzles in parallel (Mach = 4, for example) to ambient temperature and a pressure of the order of 0.1 atm. At the exit of the nozzle, the gases pass into an optical resonance cavity equipped with mirrors on two sides facing each other. The laser beam emerges, for example, through an aperture formed in one of the mirrors, at right angles to the trajectory of the gases. After the cavity, the gases are ejected through an exit tube which may be connected to a tank of great volume wherein a sufficiently low pressure is maintained.

The gaz mixture substantially has the following mole proportions: nitrogen 91.3%, $CO_2$ 7.5% and $H_2O$ 1.2%. In the case in which the water is replaced by helium, the proportions change to: nitrogen 50%, $CO_2$ 15% and He 35 %. The expansion occurs in a time which is short as compared to the relaxation time of the vibration $\nu_3$ of the asymmetrical stretch mode of $CO_2$ of 2,331 $cm^{-1}$ which is coupled to the single vibration of nitrogen of 2,349 $cm^{-1}$. At the same instant, thanks to the addition of helium or water vapour as a catalyst, the symmetrical stretch vibration which forms the low level of the laser relaxes in a time comparable to or shorter than the expansion period. This results in a depopulation of the vibrational modes $\nu_1$ and $\nu_2$ by the drop in static temperature during the expansion; in exchange, the mode $\nu_3$ of the $CO_2$ which is in equilibrium with the nitrogen vibrational mode, remains populated in manner almost equal to the population it has in the stagnation chamber. A vibrational freezing has thus been established at the exit of the nozzle, that is to say the high level population is characterized by a temperature differing but little from that in the stagnation chamber, and the low level population (symmetrical stretch vibration) is characterized by the static temperature in the area downflow of the nozzle. The result is a inversion of population between the lever $v = 1$ of $\nu_3$ and the levels $v = 1$ of $\nu_1$ or $v = 2$ of $\nu_2$, which renders the laser effect possible between these levels.

The power which may be drawn from this inversion is higher the greater the quantity of vibrational energy of the $CO_2$ and $N_2$ molecules at the inlet of the optical cavity, that is to say that the temperature and pressure levels of the gases in the stagnation chamber are high and that the losses of vibrational energy of the $CO_2$ mode $\nu_3$ coupled to the vibrational mode of $N_2$ are low. To increase the power of the laser, it would thus be necessary firstly to increase the temperature and pressure of the mixture of gases in the stagnation chamber, but this increase implies an increase in the speed of deactivation of $CO_2$. Considering that if nitrogen alone were present, it would not undergo deactivation during the expansion, but that the presence of $CO_2$ and in lesser degree that of He considerably accelerates this deactivation, it would also be necessary to reduce the percentum proportion of $CO_2$ in order to increase the power of the laser. Since the optical gain per unit of length of the laser however depends on the number of $CO_2$ molecules per unit of volume, this decrease must remain small. For these reasons, a stagnation temperature of 2,000°K, a stagnation pressure of 20 atms. and a molar percentum proportion of 7.5% of $CO_2$ appear to be limits which cannot be exceeded, the first ones in upward direction and the last in downward direction in the known thermally pumped gasdynamic lasers.

The $CO_2$ lasers of the type described in the prior art have a theoretical power of up 40 kW and the principal power loss is caused by incomplete freezing of the vibrational energy of the upper level, that is to say to the vibrational deactivation in the nozzle. The vibrational energy of the upper level is not freeze except in the proportion of 50 to 60%.

Thermically pumped gasdynamic lasers employing CO are also known in the prior art. The CO molecule offers particular advantages in producing a molecular laser. It has only one ladder of energy levels corresponding to a single vibrational mode, whereas $CO_2$ has three different vibrational modes. The lower laser level of a given transition can serve as the upper level of a subsequent transition, which renders it possible to extract the vibrational energy in the form of coherent radiation through several pairs of levels for which the populations are sufficiently inverted. In the case of CO, it is appropriate to note that consequent to a rapid redistribution of the vibrational energy between the levels, a molecule reaching a terminal laser level may be re-excited and that, as a result, the absence of the laser effect on the lower levels does not limit the efficiency. By contrast, in the case of $CO_2$, the energy of the lower laser level is dissipated rapidly as heat energy through vibration translation collisional relaxation. The result thereof is that the quantum efficiencies have as their limiting values 40% for the $CO_2$ laser, which is a system having three scales of energy, and 100% for the CO laser which is a system having no more than one.

The laser effect appears in carbon monoxide if a mean vibrational temperature of at least 2,000°K is established, the temperature of translation and thus of rotation being maintained at 200°K or less. Conditions close to these prevail in CO lasers of the electric discharge type described in the review "Characteristics of a CO laser" by Mani L. Bhaumik, W. B. Lacina and Michael M. Mann, published in the periodical "IEEE Journal of Quantum Electronics," Vol. QE-8, No. 2, February 1972, pages 150–160. In these CO lasers, the cooling of the discharge tube by means of liquid nitrogen and the addition of a monoatomic gas such as argon or helium apt to keep the temperature of rotation at low values by thermic conduction towards the walls, is essential; analogously, the addition of $N_2$ is favourable to satisfactory operation by virtue of its almost vibrational resonance with CO.

The population inversion may also be obtained by supersonic expansion of a mixture of $N_2$, CO, Ar previously heated to a temperature higher than or equal to 2,000°K, the vibrational population being apt to be maintained during the expansion if the expansion is performed in a period short before the vibrational relaxation period. The demonstration of this effet was performed by McKensie (see "Laser power at 5 μm from the supersonic expansion of carbon monoxide" Applied Physics Letters, Vol. 17, No. 10, Nov. 15, 1970, pages 462–464), with the expansion of $N_2$, CO, Ar mixtures at 2,000°K and 100 atmospheres. The difficulty of these experiments consists in the considerable cross-sectional ratio required to lower the static temperature to around 200°K. Such cross sectional ratios comprises between 500 and 2,700 imply the forming of substantial boundary layers resulting in a power loss.

Another technique researched by H. Brunet and M. Mabru (Applied Physics Letters, Vol. 21, No. 9, Nov. 1, 1972, pages 432–433) consists in initially energizing the vibration of $N_2$ by electric discharge at ambient temperature, then in the adjunction of a mixture of CO and argon, then finally in expanding the mixture in a supersonic nozzle in such manner as to reduce the static temperature to approximately 100°K. Despite its satisfactory efficiency, this system has the following shortcomings:

the gas pressures are low (a few torrs);

the output of the heat engine generating the electric power should, at all events, be taken into account for a mobile or self-contained apparatus.

In accordance with one embodiment of the invention, a mixture of $N_2$ and CO is produced direct at high temperature (2,500°K) by combustion and forms a first stream which is expanded at supersonic speed in a nozzle, whilst a cold monoatomic relaxant additive gas forming a second stream, argon or helium, at ambient temperature, is injected into the throat of this nozzle in the direction of the first stream. The process applied allows the vibrational energy of $N_2$ and CO to be freeze rapidly, whilst engendering a flow at low temperature with a Mach number of approximately 5 and this with a relatively small cross-sectional ratio. In fact a cross-sectional ratio of 50 is adequate to produce a static temperature of approximately 100°K is at least 35% in moles of monoatomic gas is injected, the initial temperature of the mixture of $N_2$ and CO being 2,500°K.

The optimum efficiency is 15%, the corresponding specific power amounting to 400 kW/(kg/s), with an initial temperature of 4,000°K.

Finally, the pumps are unnecessary, since the supersonic flow may be recompressed to a pressure higher than atmospheric for direct ejection.

In the case of a $CO_2$ gasdynamic laser, $CO_2$ cannot be produced in the combustion chamber since at sufficiently high temperature, i.e., above 1,000°C, $CO_2$ reacts with C to give CO. In this case, nitrogen alone, forming a reserve of vibrational energy, is heated within the chamber up to temperature of 2,500 to 3,000°K and cold $CO_2$ and He are mixed to $N_2$ in the throat of the nozzle. $CO_2$ and helium being injected coaxially to the flow of nitrogen, uniform flow properties are created by the injection which contributes to lower the final temperature of the $N_2$—$CO_2$—He gases and improved the laser gain.

The population inversion is caused by the phenomena of vibrational energy transfer during the mixing action. The $\nu_3$ mode of $CO_2$ becomes coupled to the nitrogen vibration, whereas the modes $\nu_1$ and $\nu_2$ are energized up to no more than the static temperature prevailing at the mixing point. This inversion appears almost instantaneously in a small area very close to the confluence of the two flows; it develops thereafter during and because of the expansion, from the spatial point of view as well as in amplitude.

So that the mixture between the hot and cold gases (these latter being $CO_2$ and He) should nevertheless be sufficiently effective, it is of importance that:

a. the speed of the gases should not be excessive, and orders of magnitude will be specified in the following;

b. the $CO_2$ and helium are fed in at the center of the flow and not through the walls of the tube;

c. the cross-section of injection is not too close to the resonance cavity.

The optimum injection is situated in an area close to the throat of the nozzle, on the axis of symmetry of the same and this area will be described further on.

The invention will now be described in detail with reference to the accompanying drawings, in which.

Figure 1:
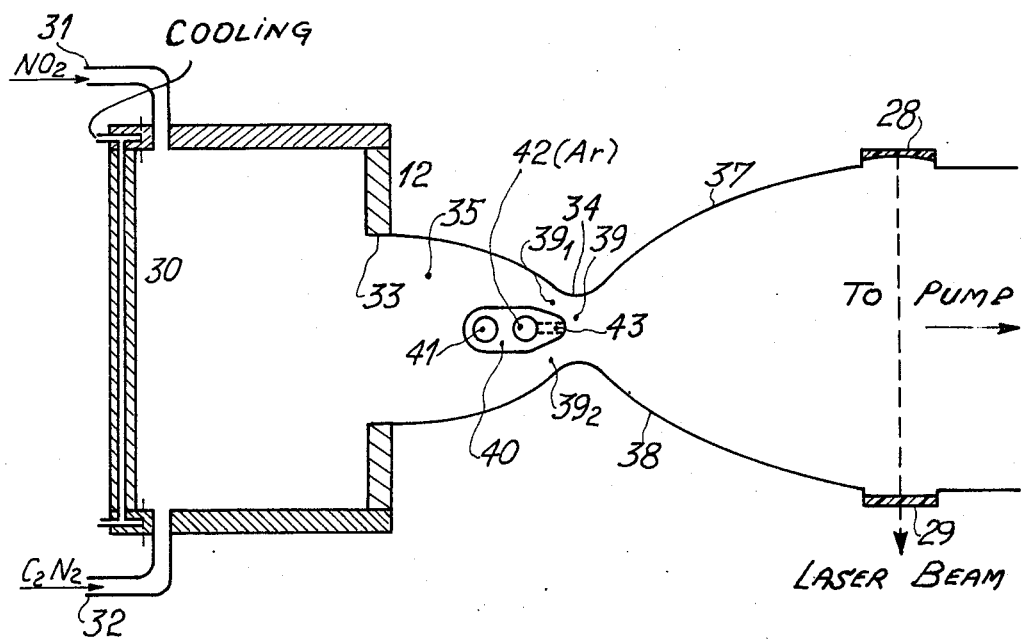
FIGS. 1 and 2 represent respectively in elevation and in perspective a molecular CO laser in accordance with the invention.

With reference to FIG. 1, 30 denotes a combustion chamber into which lead two feed pipes 31 and 32, the first 31 feeding in nitrogen dioxide $NO_2$ and the second 32 feeding in cyanogen $C_2N_2$. These two gases react in the combustion chamber 30 in accordance with the reaction

$$2\ C_2N_2 + 2\ NO_2 \rightarrow 4\ CO = 3\ N_2 + 155\ \text{kcal.}$$

The temperature of the gases amounts to 4,000°K and their pressure to 30 atmospheres. The proportions in moles of CO and $N_2$ amount to 57 and 43%. The mixture of gases emerges through the duct 33 connected to the nozzle 34.

The nozzle 34 is a two-dimensional supersonic nozzle and consists of two plane lateral surfaces of which one 35 only is visible, situated in the plane of the figure, and of two evolding convergent-divergent profiles 37 and 38. The width of the nozzle is 12 cms and its throat 39 has a nominal height of 2 mms.

In the symmetry plane of the nozzle is situated an injector 40 which resembles a symmetrical wing profile. Its trailing edge is situated in an area close to the throat 39. This area is defined in the following manner: its upflow delimitation is the minimum cross-section of the nozzle or tube minus the injector, and its downflow delimitation is the cross-section for which the height of the nozzle in the said cross-section is equal to 1.1 times the minimum height.

The trailing edge of the injector situated in the area defined in the foregoing delimits two free spaces $39_1$ and $39_2$ with the wall of the nozzle.

The thick part of the injector 40 comprises two cylindrical holes, the one 41 acting as a passage for a coolant and the other 42 acting as a feed duct for helium or argon at ambient temperature. The trailing edge of the injector is pierced by a series of holes 43 having a diameter of 0.8 mm, opening into the passage 42.

At the outlet of the divergent part of the nozzle, its height amounts to 5 cms; the temperature is the ambient temperature and the pressure 0.02 atmosphere. In these circumstances, the velocity of flow amounts to Mach = 1 in the throat of the nozzle and to Mach = 5 at the outlet. Close to the plane of the outlet, the walls of the nozzle or tube locally consist of two mirrors, the one 28 being spherical and 100% reflective, the other 29 being plane and partially transparent. The gap between these mirrors forms the optical resonance cavity.

The rates of flow are controlled so that the molar proportions substantially amount to 25% for nitrogen, 25% for CO and 50% for helium or for argon.

Instead of causing $C_2N_2$ and $NO_2$ to react, it would be possible to make use of the following reactions employing the nitrogen oxides $N_2O$ and $NO_2$:

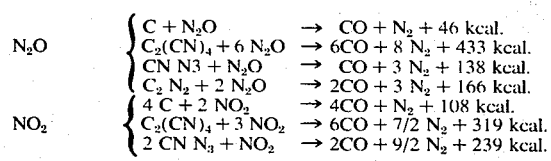

FIGS. 2a and 2b illustrate a more highly developed nozzle than that of FIG. 1. The nozzle 50 is machined from a copper block and the constriction is produced by machining in a ring or insert of graphite 51 inserted into the nozzle. The injector 52 consists of copper. The combustion chamber 30 is of stainless steel, lined internally with graphite. The walls of the chamber need not be cooled if the temperature of the reaction does not exceed 3,000°K and its duration some 10 seconds. Beyond these conditions, the walls of the combustion chamber should be cooled. The distance between the combustion chamber and the nozzle should be short, of the order of 5 to 10 cms to prevent the cooling of the gases.

The outlet orifices 53 and 53' open close to the trailing edge and are arranged symmetrically and alternately at either side of the central plane of the injector. The ducts connecting the duct 42 to these orifices are directed in such manner that the gases injected into the flow through two adjacent orifices are directed in two directions which between them subtend an angle of 34°. A flat 54 is milled moreover in alignment with each of the orifices 53, 53'.

Figure 3:
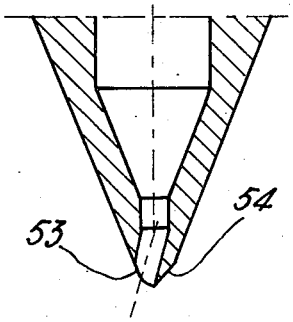
FIG. 3 represents a modified form of the nozzle of the laser.
Figure 4:
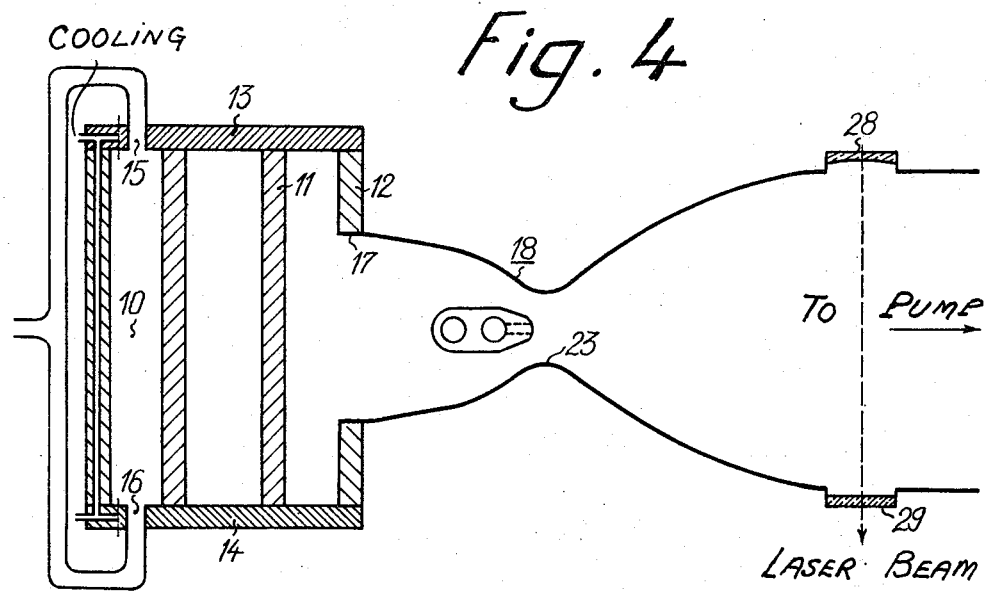
FIGS. 4 and 5 illustrate respectively in elevation and in perspective a molecular $CO_2$ laser in accordance with the invention.
Figure 5:
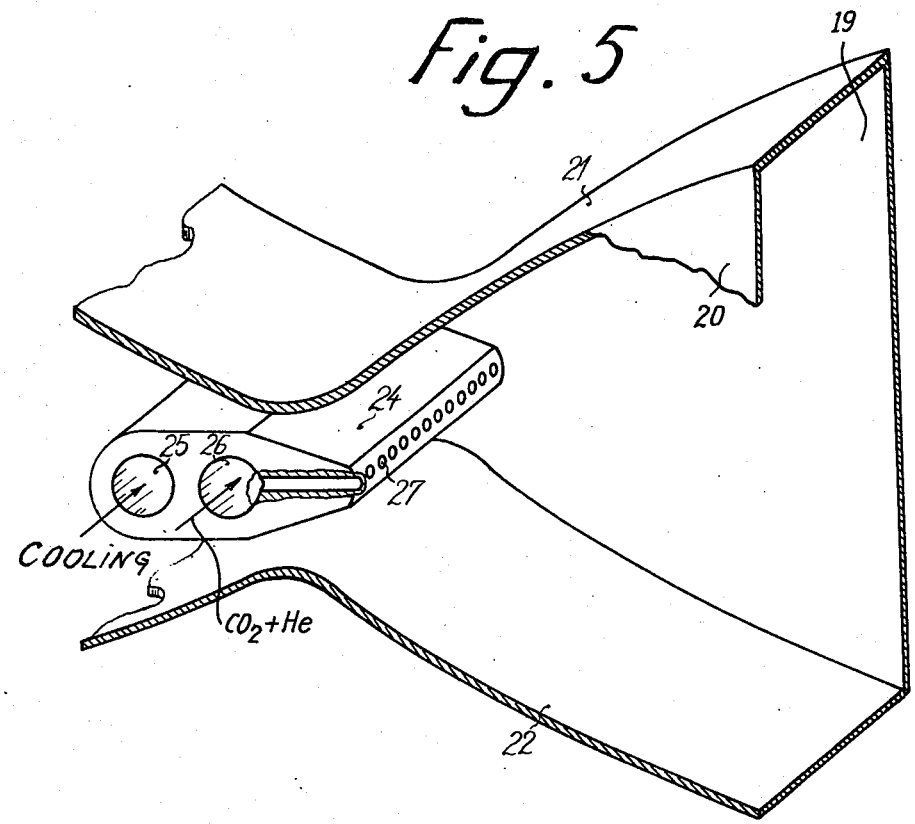

In FIGS. 3 and 4, 10 denotes a stagnation chamber formed by two coaxial cylindrical walls 11 and 12 of a diameter of 10 and 20 cms, respectively, and of a height of 30 cms, and by two flat bases 13 and 14. The cylindrical coaxial walls are made of copper and form the electrodes of an electric arc. The walls are cooled by water circulation. The nitrogen at 15 atm. passes into the chamber 10 through the pipes 15 and 16 and emerges through the pipe 17 connected to the nozzle. The electric arc raises the nitrogen to a temperature comprised between 2,500° and 3,000°K.

The nozzle 18 has a bidimensional symmetry and is formed by two plane lateral surfaces 19 and 20 and two convergent-divergent evolving profiles 21 and 22. The width of the nozzle is 12 cms and its throat 23 has a height of 2 mms.

Situated in the symmetry plane of the nozzle is an injector 24 similar to injector 40 and whose area is defined in the same manner.

The thick part of the injector 24 comprises two cylindrical holes, one 25 acting as a passage for a coolant and the other 26 acting as a feed pipe for the mixture of carbon dioxide gas and helium at ambient temperature. The trailing edge of the injector is pierced by a series of holes 27 of small diameter leading into the passage 26.

Figure 2:
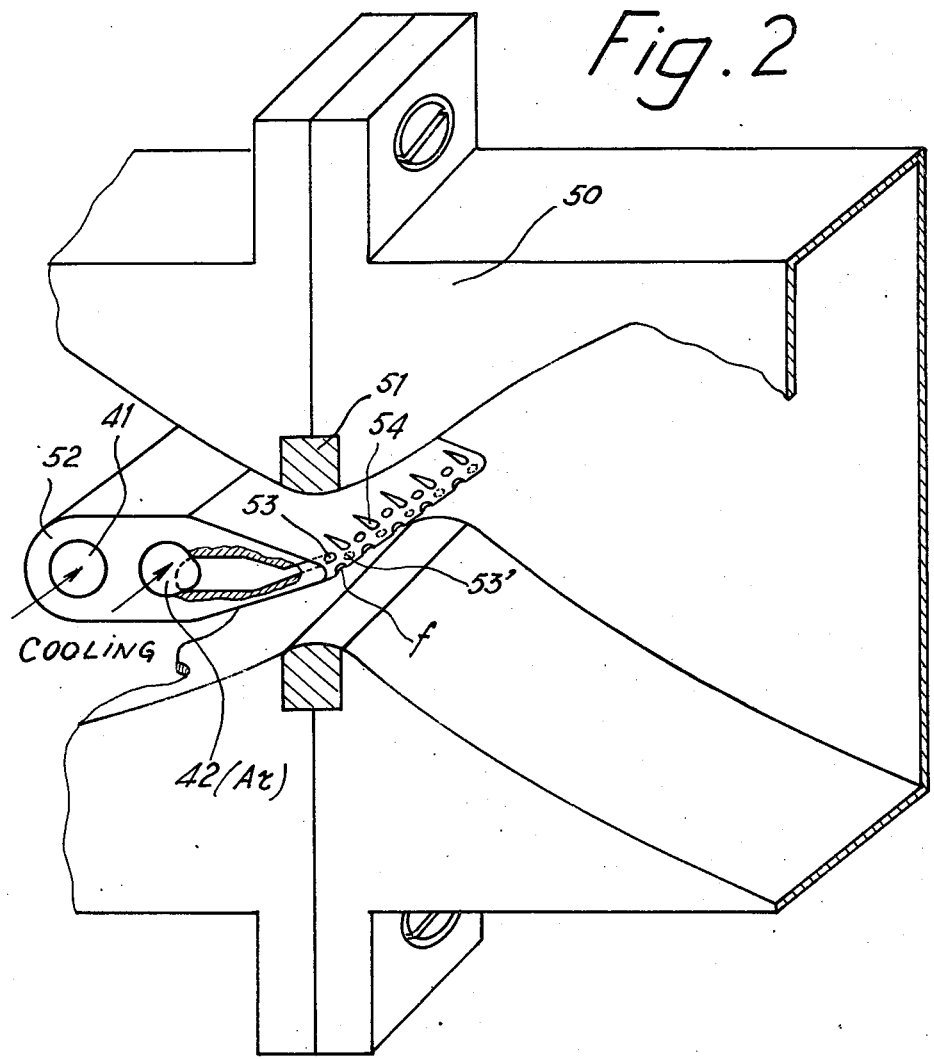

The dimension of the divergent portion of the nozzle, the temperature and the pressure of the gases and the velocity of the flow in the throat and at the outlet of the nozzle are the same as in FIGS. 1 and 2. Close to the plane of the outlet, the walls of the tube locally consist of two mirrors, one 28 being spherical and 100% reflective, and the other 29 being plane and partially transparent. The gap between these mirrors forms the optical resonance cavity.

The rates of flow are controlled so that the molar proportions should amount to 50% for nitrogen, 15% for $CO_2$ and 35% for helium, which correspond to ponderal rates of flow of 150 grammes of nitrogen per second for 60 grammes of $CO_2$ + He mixture. As the already been stated, the helium may be replaced by water, the proportions then being those specified earlier.

What we claim is:

1. A thermal mixing gas dynamic laser adapted to emit radiation by means of the expansion of a gas mixture containing as a lasing material a gas selected from the group consisting of nitrogen, a carbon oxide and mixtures thereof and further containing a relaxant additive monoatomic gas, said laser comprising:

hot gas generating means for delivering a gas flow containing at least nitrogen at high pressure and high temperature;

a convergent and divergent expanding nozzle having a throat between convergent and divergent portions thereof for expanding said gas flow to supersonic speed located downstream from said generation means;

means for adding carbon oxide to the gas flow upstream of the divergent portion of said nozzle;

an optical resonance cavity for extracting the vibrational energy of the mixed nitrogen and carbon oxide gases and producing a coherent radiation downstream from the divergent portion of said nozzle;

an injector means for adding the relaxant additive monoatomic gas to the gas mixture located in the vicinity of said throat portion of said nozzle and delivering said additive gas substantially along the direction of said gas flow; and, wherein said nozzle is bidimensional having two plane parallel and opposite sides and having other sides which are evolutive and symmetrical and wherein said injector is in the form of a wing which is traversed by a feed package for delivering the gas at the trailing edge of said wing and said wing is pierced by holes for the communication between said feed package and said nozzle.

2. A thermal mixing gas dynamic laser according to claim 1 in which said carbon oxide is carbon monoxide, and said hot gas generating means is a stagnation chamber in which nitrogen and carbon monoxide are heated and compressed.

3. A thermal mixing gas dynamic laser according to claim 1 in which said hot gas generating means is a stagnation chamber in which nitrogen is heated and compressed and said laser further comprises means to admit carbon monoxide or carbon dioxide in the injector for delivery to said gas flow at the same time as the relaxant gas is delivered.

4. A thermal mixing gas dynamic laser according to claim 1 wherein said hot gas generating means is a combustion chamber and said laser further comprises means for filling the said chamber with a mixture of a nitrogen oxide and of a carbon or carbon containing compound selected from the group consisting of cyanogen, a metal carbonyl, $C_2(CN)_4$ and $CN.N_3$ and igniting means for initiating a combustion reaction between the components of said mixture to provide a gas mixture containing nitrogen and carbon monoxide.

5. A thermal mixing gas dynamic laser according to claim 1 in which the trailing edge of said injector is situated in the portion of the nozzle limited by the cross-section of the throat and the cross-section of the divergent portion, the evolutive height of said cross-section being 1.1 times the height of the throat between the evolutive sides.

* * * * *